Patented July 3, 1951

2,559,011

UNITED STATES PATENT OFFICE 2,559,011

MANUFACTURE OF N-ALLYL DERIVATIVES OF OXAZOLIDINE-2:4-DIONES

John Stanley Herbert Davies and Wilfred Herbert Hook, Alderley Edge, England, assignors to British Schering Research Laboratories Limited, London, England No Drawing. Application October 8, 1947, Serial No. 778,744. In Great Britain September 16, 1946

Section 1, Public Law 690, August 8, 1946
Patent expires September 16, 1966

5 Claims. (Cl. 260—307)

This invention relates to improvements in and relating to the manufacture of N-allyl derivatives of oxazolidine-2:4-diones of the general formula:

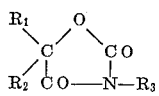

where $R_1$ and $R_2$ are hydrogen or the same or different alkyl, aryl or aralkyl radicals and $R_3$ is alkyl (including unsaturated alkyl) or aralkyl.

It is known that oxazolidine-diones can be prepared by, for example, condensing an α-hydroxy ester with urea in absolute alcohol in the presence of an alkali metal alkoxide, such as sodium ethoxide, as shown by the work of Clemmensen and Heitman (Amer. Chem. J., 1908, 40, 280; 1909, 42, 319), and by Stoughton (J. Amer. Chem. Soc., 1941, 63, 2376; U. S. specifications 2,338,064; 2,349,313; 2,349,795; 2,372,861).

It has also been stated by Speilman (J. Amer. Chem. Soc., 1944, 66, 1244) and in British specification 561,183 that N-alkyl derivatives of oxazolidine-2:4-diones can be obtained, for example, by treating an aqueous alkaline solution of the oxazolidine-dione with a dialkyl sulphate, for example dimethyl sulphate. This method, however, suffers from the disadvantage that in the case of 5:5-dimethyloxazolidine-2:4-dione and dimethyl sulphate, the yield of the N-methyl derivative is only 30–40 per cent under varied experimental conditions, whilst with diethyl sulphate no ethylation occurs. Methylation of the higher members of the oxazolidine-dione series gives yields of 50–60 per cent. Another method proposed by Spielman (loc. cit.) and in British specification No. 561,183 consists in treating the silver salt of the oxazolidine-dione with an ethereal solution of an alkyl halide, for example, ethyl iodide. As a process of manufacture, this method is unsatisfactory and is open to the objection that it requires expensive and dangerous materials to carry it into effect. In addition, both methods suffer from the disadvantage that it is first necessary to obtain in the free state the oxazolidine-dione to be alkylated.

The present invention obviates such disadvantages by providing an improved process for the production of N-alkyl or N-aralkyl derivatives of oxazolidine-diones of the aforesaid formula, according to which the alkylation or aralkylation is effected in the presence of an alkali metal alkoxide, such as sodium ethoxide, in a suitable solvent, such as absolute alcohol. As examples of alkylating agent there may be mentioned a dialkyl sulphate, such as dimethyl sulphate or diethyl sulphate, an alkyl halide, such as methyl iodide and an aralkyl halide, such as benzyl bromide.

According to another feature of the invention, after condensing an α-hydroxy ester, for example dimethyl glycollic ester, with urea in the presence of sodium ethoxide, neither 5:5-dimethyloxazolidine-2:4-dione nor its sodium salt need be isolated, the N-alkylation or N-aralkylation being proceeded with directly by further treatment with the desired alkylating or aralkylating agent.

The improved processes give a greatly increased yield of the N-alkyl and N-aralkyl oxazolidine-diones, they are simpler in operation, and the final products are obtained in a high degree of purity, and thus obviate any tedious fractionation.

The following examples, in which the parts are expressed by weight, illustrate but do not limit the invention.

Example 1

To a cooled solution of 23 parts of sodium in 400 parts of dry ethanol are added 60 parts of dry urea and 132 parts of ethyl α-hydroxy-iso-butyrate. The mixture is heated on a steam bath under reflux for about 16 hours and the liberated ammonia is removed from the solution by drawing a current of dry air through it at the boiling point. The solution of the sodium salt of 5:5-dimethyloxazolidine-2:4-dione so obtained is cooled and treated with 284 parts of methyl iodide. The mixture is allowed to stand at room temperature for three days, excess methyl iodide and ethanol are then removed by distillation under reduced pressure. The residue is dissolved in ether and the solution is washed with sodium chloride solution and then with a little sodium thiosulphate solution. The ethereal solution is dried over sodium sulphate and ether removed by distillation. A yield of 108 parts of 3:5:5-trimethyloxazolidine-2:4-dione is obtained having a melting point of 45–46° C. with slight softening at 43° C. This represents a 75 per cent theory yield on the ethyl α-hydroxy-iso-butyrate taken. The product may be further purified by dissolving the minimum quantity of dry ether and cooling to −10° C. The product so obtained melts sharply at 45.5–46.5° C.

Example 2

To a cooled solution of 4.6 parts of sodium in 80 parts of dry ethanol are added with stirring 25.8 parts of 5:5-dimethyloxazolidine-2:4-dione. The solution is treated dropwise with 25.2 parts of dimethyl sulphate with cooling and stirring, and allowed to stand at room temperature for about 16 hours. The ethanol is then removed by distillation under reduced pressure, and the product treated with ether and iced-water and washed with salt solution. The ethereal extract is dried and the ether removed by distillation. Recrystallisation of the product from ether yields 3:5:5-trimethyloxazolidine-2:4-dione in 81 per cent yield.

Example 3

An alcoholic solution of the sodium salt of 5:5-dimethyloxazolidine-2:4-dione, prepared as in Example 1 using 4.6 parts of sodium, 80 parts of dry ethanol, 12 parts of urea and 26.4 parts of ethyl α-hydroxy-iso-butyrate, is cooled in ice and treated dropwise with 30.8 parts of diethyl sulphate with stirring. After standing at room temperature for 16 hours, the solution is refluxed for 1 hour. The ethanol is then removed by distillation under reduced pressure, and the residue is treated with ether and iced-water. The ether extract, after washing with salt solution and drying, is distilled to remove the solvent. Crystallisation of the residue from ether yields 5:5-dimethyl-3-ethyloxazolidine-2:4-dione as flat vitreous prisms, M. P. 76–77° C. in 71% yield. (Found: C, 53.7; H, 7.1. $C_7H_{11}O_3N$ requires C, C, 53.5; H, 7.0%.)

Example 4

An alcoholic solution of the sodium salt of 5:5-dimethyl-oxazolidine-2:4-dione, prepared as in Example 3, is treated at room temperature with 51.3 parts of benzyl bromide. The product, after standing for 24 hours and heating on the steam-bath for 4 hours, is worked up as in the previous examples, unchanged benzyl bromide being removed by distillation. The reaction product may be purified by crystallising from absolute alcohol, when pure 5:5-dimethyl-3-benzyloxazolidine-2:4-dione, M. P. 60–61° C. is obtained as colourless prisms in 74% yield. (Found: C, 65.9; H, 6.1. $C_{12}H_{13}O_3N$ requires C, 65.8; H, 5.9%.)

Example 5

To an alcoholic solution of the sodium salt of 5:5-di-methyloxazolidine-2:4-dione, prepared as in Example 3, are added 37 parts of n-propyl bromide. The mixture is refluxed for 6 hours and worked up as in Example 3. Crystallisation of the product from ether yields 5:5-dimethyl-3-n-propyloxazolidine-2:4-dione, M. P. 46–47° C., in 61% yield. (Found: C, 56.0; H, 7.5. $C_8H_{13}O_3N$ requires C, 56.1; H, 7.6%.)

Example 6

To an alcoholic solution of the sodium salt of 5:5-di-methyloxazolidine-2:4-dione, prepared as in Example 3, are added 51 parts of iso-propyl iodide. The mixture is refluxed for 40 hours and worked up as in Example 3. Crystallisation of the product from ethanol yields 5:5-dimethyl-3-iso-propyloxazolidine-2:4-dione, M. P. 89–90° C. in 40% yield. (Found: C, 56.1; H, 7.6. $C_8H_{13}O_3N$ requires C, 56.1; H, 7.6%.)

Example 7

To an alcoholic solution of the sodium salt of 5:5-di-methyloxazolidine-2:4-dione, prepared as in Example 3, are added 55 parts of n-butyl iodide. The mixture is refluxed for 40 hours and worked up as in Example 3. Distillation of the crude product yields 5:5-dimethyl-3-n-butyl-oxazolidine-2:4-dione as a colourless mobile oil, B. P. 68–70° C./0.6 mm., $n_D^{20°}$ 1.4455, in 81% yield. (Found: C, 58.2; H, 8.2. $C_9H_{15}O_3N$ requires C, 58.4; H, 8.1%.)

Example 8

To an alcoholic solution of the sodium salt of 5:5-dimethyloxazolidine-2:4-dione, prepared as in Example 3, are added 55 parts of iso-butyl iodide. The mixture is refluxed for 30 hours and worked up as in Example 3. Distillation of the crude product yields 5:5-dimethyl-3-iso-butyl-oxazolidine-2:4-dione as a colourless mobile oil, B. P. 64–66° C./0.7 mm., $n_D^{20°}$ 1.4446, in 43% yield. (Found: C, 58.2; H, 8.0. $C_9H_{15}O_3N$ requires C, 58.4; H, 8.1%.)

Example 9

To an alcoholic solution of the sodium salt of 5:5-dimethyloxazolidine-2:4-dione, prepared as in Example 3, are added 45 parts of n-amyl bromide. The mixture is refluxed for 6 hours and worked up as in Example 3. Distillation of the crude product yields 5:5-dimethyl-3-n-amyloxazolidine-2:4-dione as a colourless mobile oil, B. P. 80–81° C./0.5 mm., $n_D^{20°}$ 1.44470, in 65% yield. (Found: C, 60.6; H, 8.3. $C_{10}H_{17}O_3N$ requires C, 60.3; H, 8.5%.)

Example 10

To an alcoholic solution of the sodium salt of 5:5-dimethyloxazolidine-2:4-dione, prepared as in Example 3, are added 45 parts of iso-amyl bromide. The mixture is refluxed for 6 hours and worked up as in Example 3. Distillation of the crude product yields 5:5-dimethyl-3-iso-amyloxazolidine-2:4-dione as a colourless mobile oil, B. P. 76–77° C./0.7 mm., $n_D^{20°}$ 1.4456, in 50% yield. (Found: C, 60.9; H, 8.6. $C_{10}H_{17}O_3N$ requires C, 60.3; H, 8.5%.)

Example 11

20.8 parts of ethyl glycollate and 12 parts of urea are added to an alcoholic solution of sodium ethoxide prepared from 4.6 parts of sodium and 100 parts of ethyl alcohol. The mixture is boiled under reflux for 16 hours. Ammonia is evolved and the sodium salt of oxazolidine-2:4-dione is precipitated. After removing ammonia by a current of dry air and cooling, 46.8 parts of ethyl iodide are added and the mixture is boiled under reflux for 18 hours. The alcohol is then removed by distillation under reduced pressure, iced-brine is added to the residue which is then extracted with ether. After washing the ether with aqueous sodium thiosulphate, drying over sodium sulphate, and removing the solvent, 3-ethyl-oxazolidine-2:4-dione is obtained in 40% yield as an oil, B. P. 110–116° C./12 mm. It may be purified by redistillation when it boils at 100–102° C./9 mm. (Found: C, 45.9; H, 5.3. $C_5H_7O_3N$ requires C, 46.5; H, 5.4%.)

Example 12

To the alcoholic solution of the sodium salt of 5-methyl-oxazolidine-2:4-dione, prepared by the method described in the previous examples using 4.6 parts of sodium, 12 parts of urea, 23.6 parts of ethyl lactate and 100 parts of ethyl alcohol, are added 46 parts of ethyl iodide. After standing for 16 hours at room temperature, the mixture is boiled under reflux for 6 hours. After removal of the solvent, ether extraction and subsequent distillation furnishes 3-ethyl-5-methyl-oxazolidine-2:4-dione in 66% yield as an oil, B. P. 99–102° C./14–15 mm., which solidifies on standing. After crystallisation from ether or light petroleum, it melts at 26° C. (Found: C, 49.7; H, 6.3. $C_6H_9O_3N$ requires C, 50.3; H, 6.3%.)

*Example 13*

Following the procedure of Example 12, 9.2 parts of sodium, 24 parts of urea, 58.4 parts of ethyl α-methyl-α-hydroxybutyrate, 200 parts of ethyl alcohol and 85.2 parts of methyl iodide furnish 3:5-dimethyl-5-ethyloxazolidine-2:4-dione in 73% theory yield as a colourless oil, B. P. 100–102° C./16 mm.

*Example 14*

If in Example 12, 23.6 parts of ethyl lactate are replaced by 51.2 parts of ethyl benzilate, 3-ethyl-5:5-diphenyloxazolidine-2:4-dione is obtained in 55% theory yield. It melts at 90° C. after crystallisation from methyl alcohol. (Found: C, 72.8; H, 5.1. $C_{17}H_{15}O_3N$ requires C, 72.6; H, 5.3%.)

*Example 15*

24.45 parts of 5-methyl-5-phenyloxazolidine-2:4-dione, obtained by the method of Stoughton (J. Amer. Chem. Soc., 1941, 63, 2377), are dissolved in 20 parts of ethyl alcohol. The solution is added to a solution of sodium ethoxide prepared from 2.9 parts of sodium and 100 parts of ethyl alcohol. 27.3 parts of methyl iodide are then added and the mixture is allowed to stand overnight at room temperature, after which it is boiled under reflux for 4 hours. 3:5-dimethyl-5-phenyloxazolidine-2:4-dione is obtained in 73% theory yield as a colourless oil, B. P. 168–169° C./17–18 mm. (Found: C, 64.0; H, 5.5. $C_{11}H_{11}O_3N$ requires C, 64.4; H, 5.4%.)

*Example 16*

11.5 parts of 5-methyloxazolidine-2:4-dione, prepared by the method of Stoughton (loc. cit.), are added to a solution of sodium ethoxide prepared from 2.3 parts of sodium and 50 parts of ethyl alcohol. 18.1 parts of allyl bromide are then added. After allowing the mixture to stand at room temperature overnight and then boiling under reflux for 6 hours, 3-allyl-5-methyloxazolidine-2:4-dione is obtained in 72% yield as a colourless oil, B. P. 129–132° C. at 18 mm. On redistillation it boils at 86–87° C./0.5 mm. (Found: C, 53.7; H, 5.6. $C_7H_9O_3N$ requires: C, 54.2; H, 5.8%.)

*Example 17*

Following the procedure of Example 12, 4.6 parts of sodium, 12 parts of urea, 41.6 parts of ethyl α-methyl-α-benzylglycollate B. P. 138° C./15 mm. (Found: C, 69.3; H, 7.8. $C_{12}H_{16}O_3$ requires C, 69.2; H, 7.7%), 100 parts of ethyl alcohol and 62.4 parts of ethyl iodide furnish 3-ethyl-5-methyl-5-benzyloxazolidine-2:4-dione in 70% yield. The pure product melts at 67–68° C. (Found: C, 67.4; H, 6.7. $C_{13}H_{15}O_3N$ requires C, 66.9; H, 6.4%.)

*Example 18*

25.8 parts of 5:5-dimethyloxazolidine-2:4-dione are added to a solution prepared from 7.8 parts of potassium and 100 parts of methanol. To the resulting solution are added slowly with stirring 30.8 parts of diethyl sulphate. The mixture is refluxed for 2 hours; the methanol is removed by distillation and the residue dissolved in ether and washed with brine. After drying and evaporating the solvent, 27.5 parts (85%) of 5:5-dimethyl-3-ethyloxazolidine-2:4-dione are obtained. The product once crystallized from ether melts at 76–77° C.

It is to be understood that the word "alkylating" used in the claims includes "aralkylating."
What we claim is:

1. As a new compound, 3-allyl-5-methyloxazolidine-2:4-dione.

2. Process for the manufacture of 3-allyl-5-methyloxazolidine-2:4-dione by the action of allyl bromide on 5-methyloxazolidine-2:4-dione in an alkaline non-aqueous medium.

3. Process as in claim 2 in which the alkaline non-aqueous medium is an alcoholic solution of an alkali metal alkoxide.

4. Process as in claim 2 in which the dione is present as its alkali metal salt.

5. Process as in claim 4 in which the non-aqueous medium is alcoholic.

JOHN STANLEY HERBERT DAVIES.
WILFRED HERBERT HOOK.

REFERENCES CITED

The following references are of record in the file of this patent:

FOREIGN PATENTS

| Number | Country | Date |
|---|---|---|
| 728,036 | Germany | Oct. 15, 1942 |

OTHER REFERENCES

Chemical Abstracts, vol. 14 (1920), pp. 46 to 48, especially p. 48 citing: Ahlquist, J. Prakt. Chem., 99:45–84 (1919).

Spielman: Jour. Amer. Chem. Soc., vol. 66, pp. 1244–1245, 1944.

Groggins: Unit Processes, 2nd edition, p. 501.